US005542099A

United States Patent [19]

Grube et al.

[11] Patent Number: 5,542,099

[45] **Date of Patent: *Jul. 30, 1996**

[54] SIMULCAST GROUP DETERMINATION OF BEST SIGNAL

[75] Inventors: Gary W. Grube, Palatine; Mark L. Shaughnessy, Algonquin; Richard Ng, Palatine, all of Ill.

[73] Assignee: Motorola, Inc., Schaumburg, Ill.

[ * ] Notice: The term of this patent shall not extend beyond the expiration date of Pat. No. 5,448,758.

[21] Appl. No.: 442,090

[22] Filed: May 15, 1995

Related U.S. Application Data

[63] Continuation of Ser. No. 23,536, Feb. 26, 1993, abandoned.

[51] Int. Cl.[6] .................................................... H04B 1/00

[52] U.S. Cl. ...................... 455/51.2; 455/33.1; 455/51.4; 455/54.1; 375/356

[58] Field of Search ................................ 455/51.2, 67.1, 455/69, 54.1, 53.1, 54.2, 33.1, 33.4, 51.1, 62; 379/58, 60, 59; 375/356, 258

[56] References Cited

U.S. PATENT DOCUMENTS

| | | | |
|---|---|---|---|
| 4,317,218 | 2/1982 | Perry | 455/54.1 |
| 4,850,032 | 7/1989 | Freeburg | 455/51.2 |
| 5,220,676 | 6/1993 | LoGalbo et al. | 455/51.2 |
| 5,255,291 | 10/1993 | Holden et al. | 375/107 |

*Primary Examiner*—Andrew Faile
*Assistant Examiner*—Doris To
*Attorney, Agent, or Firm*—Susan L. Lukasik

[57] ABSTRACT

Processing of dispatch calls in a simulcast multi-site communication system begins when a source communication unit transmits a message to one or more network receivers. The received signals are analyzed at the received sites to determine a signal quality metric. Each of the signals are time stamped to identify when they where received. The received signals are transported with their time stamp and signal quality metric to each of the other sites via a digital communication network connecting the sites. Each transmitter site performs a transmit operation by first determining the receiver source with the best quality signal as indicated by the signal quality metric. The determined best quality signal is stored until it is time to transmit the signal in phase with all the other transmitter sites in a simulcast manner. The time stamp allows a time in the future to be chosen to accommodate the worst case expected transport delay through the digital network.

15 Claims, 6 Drawing Sheets

SIMULCAST GROUP DETERMINATION OF BEST SIGNAL

This is a continuation of application Ser. No. 08/023,536, filed Feb. 26, 1993 and now abandoned.

FIELD OF THE INVENTION

This invention relates generally to communication systems and, in particular, to simulcast group dispatch call processing.

Reference is made to U.S. patent application No. 08/023,982, titled "Simulcast Group Determination of Best Signal by Master Site," which contains related material. Reference is also made to U.S. patent application No. 08/023,514, titled "Method for Selecting a Highest Quality Signal for Retransmission by Base Sites in a Simulcast Communication System," which also contains related material. Both U.S. Patent Applications were filed on Feb. 26, 1993 by Gary W. Grube, Mark L. Shaughnessy, and Richard Ng, the same inventors as the present application, with the same assignee as the present invention.

BACKGROUND OF THE INVENTION

The basic operation and structure of land mobile radio communication systems are known. Communication systems typically comprise a plurality of communication units (vehicle mounted or portable radios in a land mobile system and radio/telephones in a cellular system), a predetermined number of transceivers, which are located throughout a geographic region and transceive information via communication channels, and a controlling entity. The controlling entity may either be a centralized call processing controller or it may be a network of distributed controllers working together to establish communication paths for the communication units. The communication channels may be time division multiplex (TDM) slots, carrier frequencies, a pair of carrier frequencies or other radio frequency (RF) transmission medium. A frequency or time portion of one or more of the communication channels may be established for call control purposes such that a communication unit may communicate with the system controller to request and receive system resources.

In a trunked land mobile communication system, the plurality of communication units are arranged into communication groups, or talk groups. A communication unit in a particular talk group may initiate a dispatch call by pressing a push-to-talk (PTT) button which informs the controller that a communication channel is needed for this particular talk group. If a communication channel is available, the controller allocates it to the particular talk group and sends out a message on the control channel to the plurality of communication units. The communication units in the particular talk group, after receiving the message, affiliate themselves with the allocated communication channel such that each member of the particular talk group can participate in the dispatch call. The number of communication units in any one dispatch call could range from just a few communication units to a few hundred communication units.

Multiple site communication systems which comprise a plurality of repeater sites over a large geographic region are known. In such systems, communication units of a particular talk group may be located anywhere in the multi-site coverage area. To establish a group call, the multi-site system must be able to quickly and efficiently set-up communication paths, or inter-site links, between all the sites, or between just those sites having a member of the particular talk group located within it. One method of establishing the communication links is simulcast. Simulcast uses the same communication channel (or carrier frequency) in each site for the particular group. This is an efficient frequency reuse technique when members of the particular group are routinely located throughout the multi-site system.

A typical transceiver in a simulcast multi-site communication system comprises an individual circuit that couples the transceiver to a central radio system audio collection and distribution point (prime site). Each transceiver receives signals on the same frequency and transports the signals to the single audio collection point where a single signal comparator selects the best signal from all the sites. (Note that a site in the multi-site system may contain a transceiver (transmitter and receiver) or only a receiver.) The signal selected as the best is distributed from the centralized point on links back to the transceiver sites for simultaneous re-transmission. To accurately re-transmit the best signal, dedicated, stable, and time-invariant links are used. For example, the links may be analog and/or digital microwave channels. Note that switching systems are not used as links because they are not time-invariant.

With the dedicated, stable, and time invariant links, the site transmitters can re-broadcast the best signal in phase, in time, and on the same frequency such that received signal distortion in overlapping site coverage areas is minimal. The stability of the links ensure that the resulting simulcasted signals remain within acceptable tolerances.

To account for the difference in the physical link transport time delays between the single point of audio distribution and remote site transmitters, additional adjustable delay circuits are typically added to the links. The adjustable delay circuits compensate for the differences in physical link delay such that the total delay is the same at each transceiver site. Thus ensuring that the signal for transmission arrives at each transceiver site at the exact same time. The adjustable time delay devices added to the transmission distribution links may be at either the prime or remote sites.

To accommodate for fluctuations in physical link delays, means have been devised to manually or automatically adjust the adjustable time delay circuits. However, it is difficult for simulcast systems to adapt to time changes while user traffic is in progress. Typically, the channel must be excluded from service while a closed loop test is performed to measure and adjust the delay.

Many users of a simulcast system need immediate and constant access to their system channels. For these users disabling a channel for service is inconvenient at best and potentially catastrophic. Such is certainly the case for Public Safety users and centralized controller systems. If the centralized controller is cut off from the system due to a channel being down, communication units cannot communicate. To avoid this, some systems include duplicate prime site equipment. The duplicate equipment involves added logic and switching functions which slows the switch-over process.

Therefore, a need exists for a multi-site simulcast communication system that can efficiently utilize time-invariant or time-variant distribution links, be constructed without the delays of typical switching systems and that can instantly adapt to site failures and maintain the same constant grade of service while simulcasting transmissions.

DESCRIPTION OF A PREFERRED EMBODIMENT

Figure 1:
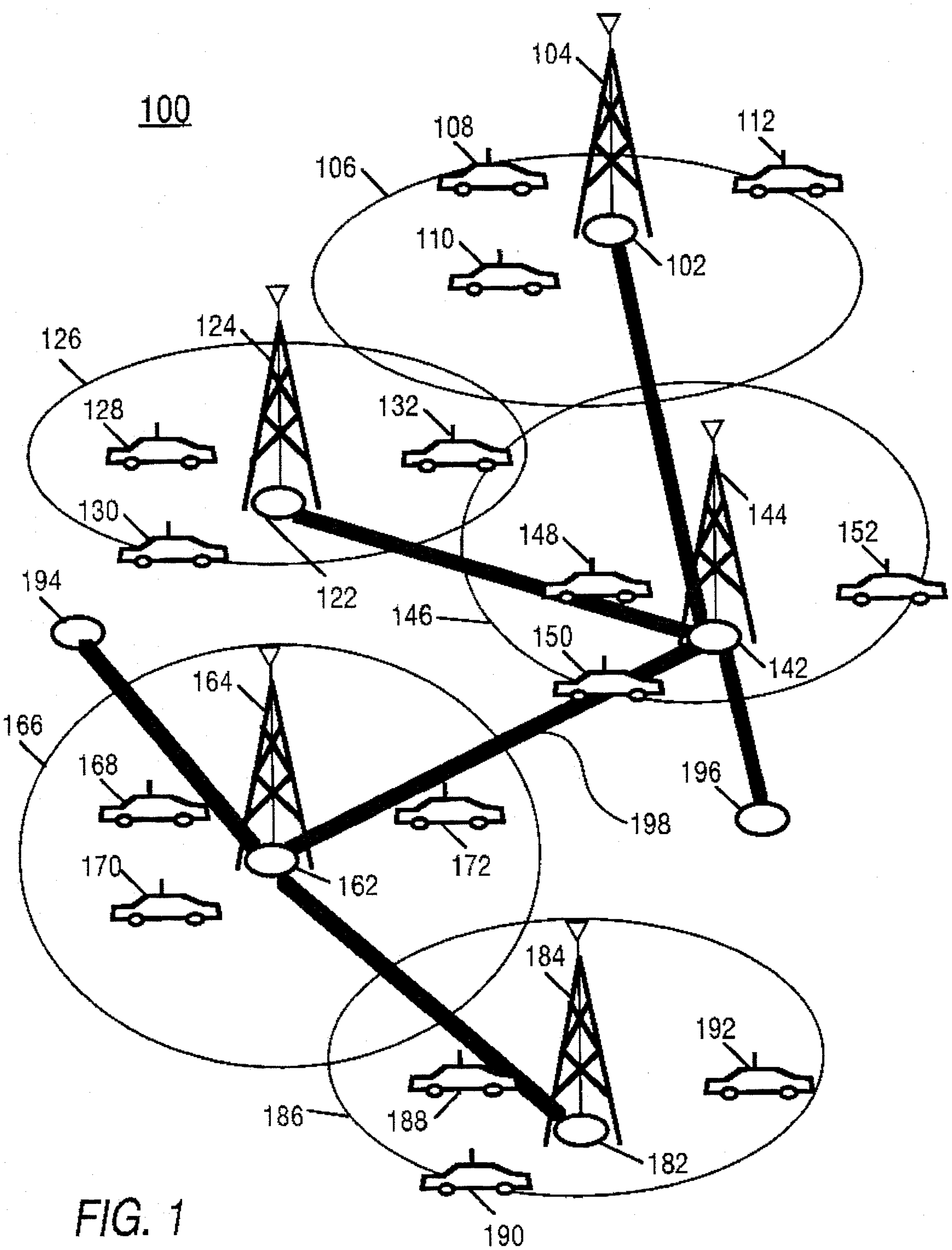
FIG. 1 illustrates a multi-site communication system that provides radio communication between communication units in accordance with the present invention.

FIG.1 illustrates a multi-site simulcast communication system 100 that comprises network nodes, or sites, 102, 122, 142, 162, 182, 194, and 196 (7 shown), vehicle mounted communication units 108, 110, 112, 128, 130, 132, 148, 150, 152, 168, 170, 172, 188, 190, and 192 (15 shown), repeaters 104, 124, 144, 164, and 184 (5 shown), and sites having respective coverage areas 106, 126, 146, 166, and 186 (5 shown). The figure depicts overlapping coverage areas of sites such that there is a seamless operating area. The sites are linked together in a non-star digital communication network 198, such that every site is connected to every other site, although not necessarily by a direct path. The typical star configuration of prior art simulcast systems is unnecessary. Further, some of the sites (102, 122, 142, 162, and 182) include repeaters to provide radio coverage areas, while other sites (194 and 196) do not. The sites without repeaters may be interconnected to consoles at dispatch centers which are not co-located at repeater sites, or they may simply be composed of a single call processing controller. (Note that a repeater may include a transceiver (receiver and transmitter) or just a receiver.)

Figure 2:
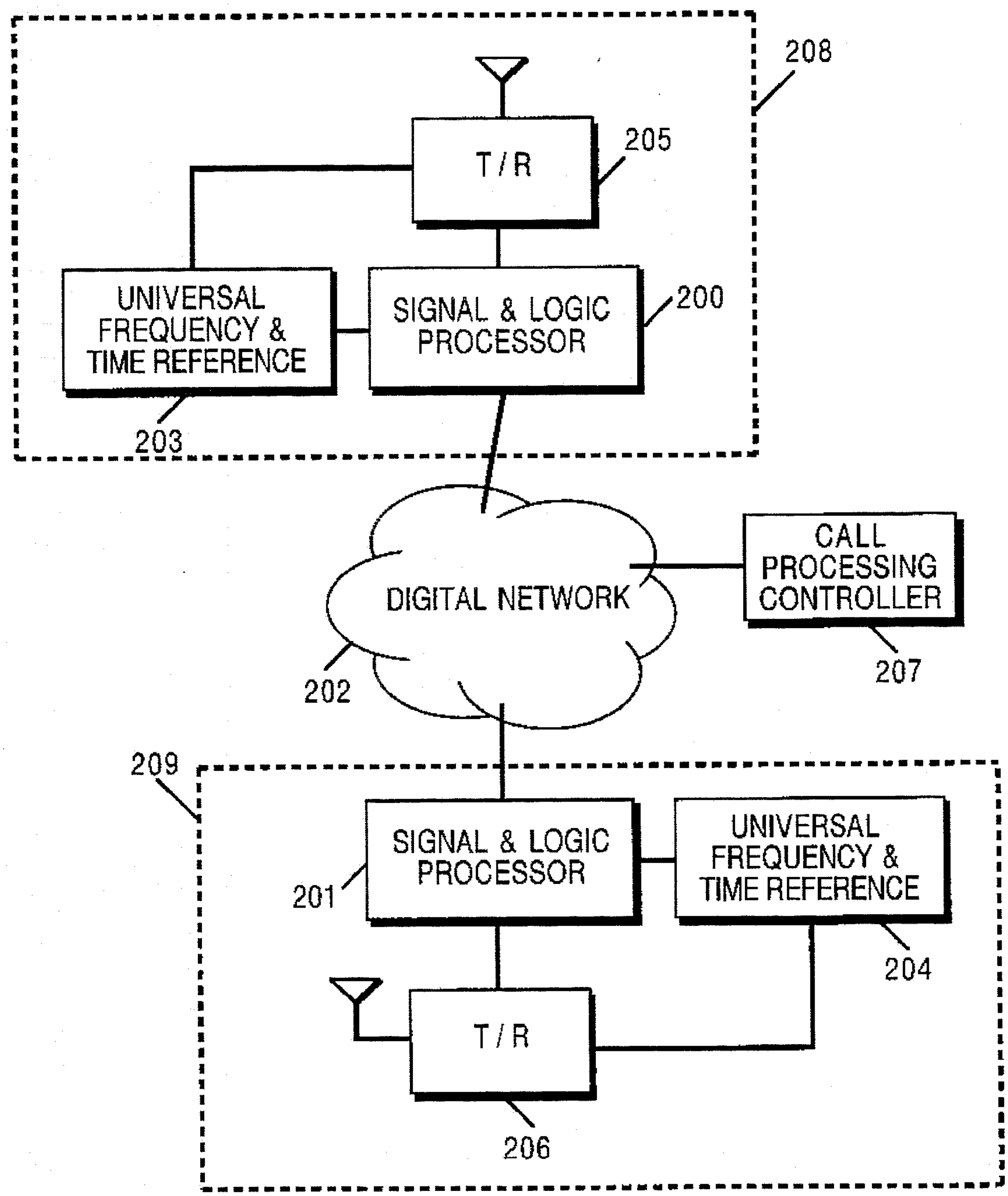
FIG. 2 illustrates a multi-site communication system that may incorporate the present invention.

FIG. 2 illustrates the same simulcast communication system as FIG. 1 but with a focus on site equipment coupled to the digital communication network. A first simulcast site 208, comprises at least one signal and logic processor 200, at least one repeater 205, and at least one universal frequency and time reference 203. The signal and logic processor 200 may comprise a Motorola IntelliRepeater Station Control Board. A second site 209 also comprises a signal and logic processor 201, a universal frequency and time reference 204 and a repeater 206. The first and second sites 208 and 209 are operably connected to all other sites via the digital communication network 202. The digital communication network carries both communication message payloads and control messages to establish communication. At least one call processing controller 207 is operably connected to the digital communication network to direct call establishment activity. Note that each radio network or sub-network must at least include one call processing controller at any network node to establish communication between two or more communication units and network users. Further note that there may be multiple call processing controllers at different nodes in the network such that each call processing controller takes responsibility for different sub-networks of the network, where a sub-network is any subset of the total network nodes. Still further note that there is no requirement that a call processing controller be responsible for the site at which it is located. For example, a network consisting of many nodes which are considered to encompass several sub-networks, may have all call processing controllers located at the same node.

Figure 3:
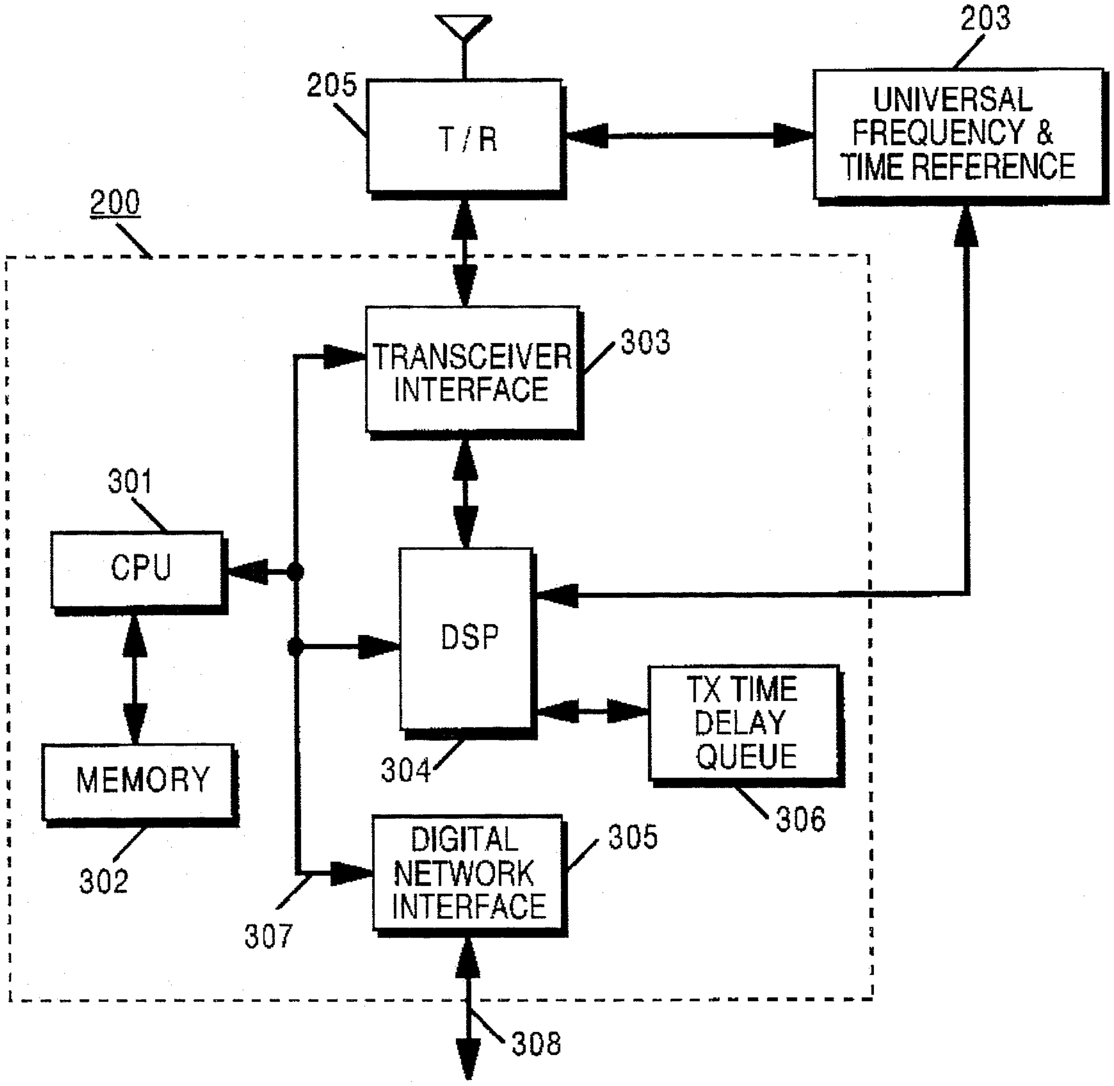
FIG. 3 illustrates the components associated with each transceiver to process logic functions and signals in accordance with the present invention.

FIG. 3 illustrates the first site 208 (second site 209 or any site in the system) which contains a repeater 205 and the associated functionality of the signal and logic processor 200. The repeater 205 is a transceiver used to receive and transmit radio frequency signals to and from the target communication units. The signal and logic processor 200, comprising a CPU 301, memory 302 for the CPU operations, transceiver interface 303 to operably connect the repeater to the signal and logic processor 200, a Digital Signal Processor (DSP) 304 to digitally process receive and transmit signals, a digital communication network interface 305 connected to both an external digital link 308 and an internal digital bus 307 to operably connect the transceiver to the other sites, a transmit time delay queue 306 to store buffered signals for transmission, and a universal frequency and time reference 203 such as a Global Positioning Satellite (GPS) receiver to provide a frequency standard to the transceiver and a time standard to the transmit launch time processing. The CPU 301 may comprise a Motorola MC68302. The DSP 304 may comprise a DSP56002. Each of these elements are readily known in the art, thus no further discussion will be presented except to facilitate the understanding of the present invention.

Figure 4:
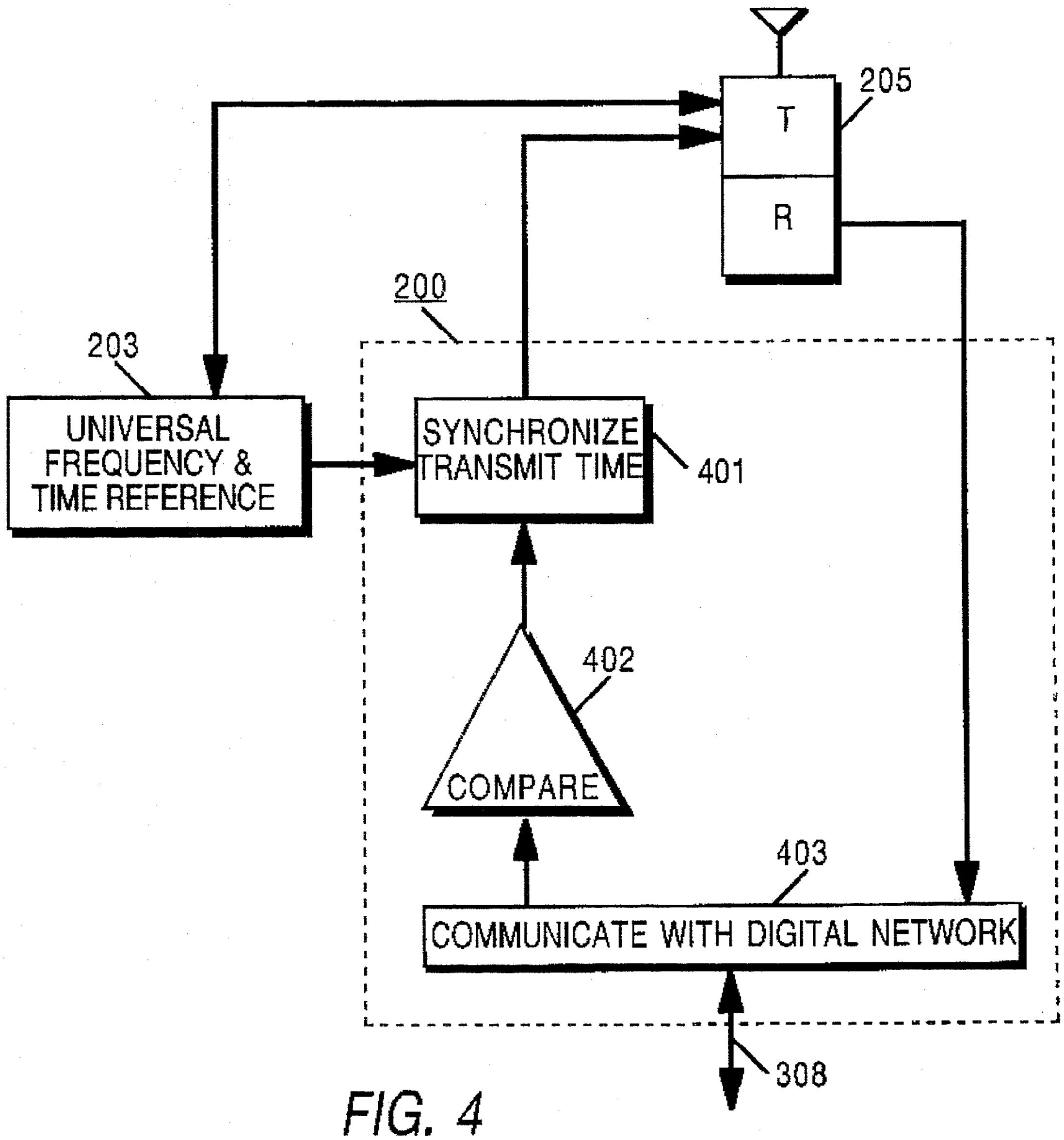
FIG. 4 illustrates a functional block diagram for a site in accordance with the present invention.

FIG. 4 illustrates a functional block diagram for the first site 208 (second site 209 or any site in the system) which comprises signal and logic processor 200, universal frequency and time reference 203, and transceiver 205. During an active communication, receive signals are demodulated by the transceiver 205 and transported to a digital communication network 403 over the digital link 308 so that the received information is broadcast to other sites connected to the digital communication network. Likewise, each site receives potential messages from the other sites that represent the same transmitting communication unit. This is so since at least one transceiver in the site of a simulcast network is configured on the same frequency pair. (Note that every site is not required to have a transceiver, the site may only contain a receiver.) The proximity of the transmitting field communication unit to the transceiver will determine the quality of the resulting received signal. Multiple copies, therefore, of the same source transmission are likely to arrive from the network, each with varying quality levels. As simulcast systems must transmit the same pattern, or source, of transmit modulation, each site must pick the same single source to rebroadcast. Therefore, each site has a compare function 402 to determine the same best quality signal based on the quality level of the received signal. The source with the best quality signal is chosen for transmission at each site. The final step is to time synchronize 401 the transmit signal such that it will be transmitted in phase with all the other sites. The external time reference 203 provides each site with a synchronized time reference. This allows the same signal to be launched at the same time, resulting in the signal being transmitted substantially in phase with the other transmitter sites.

Figure 5:
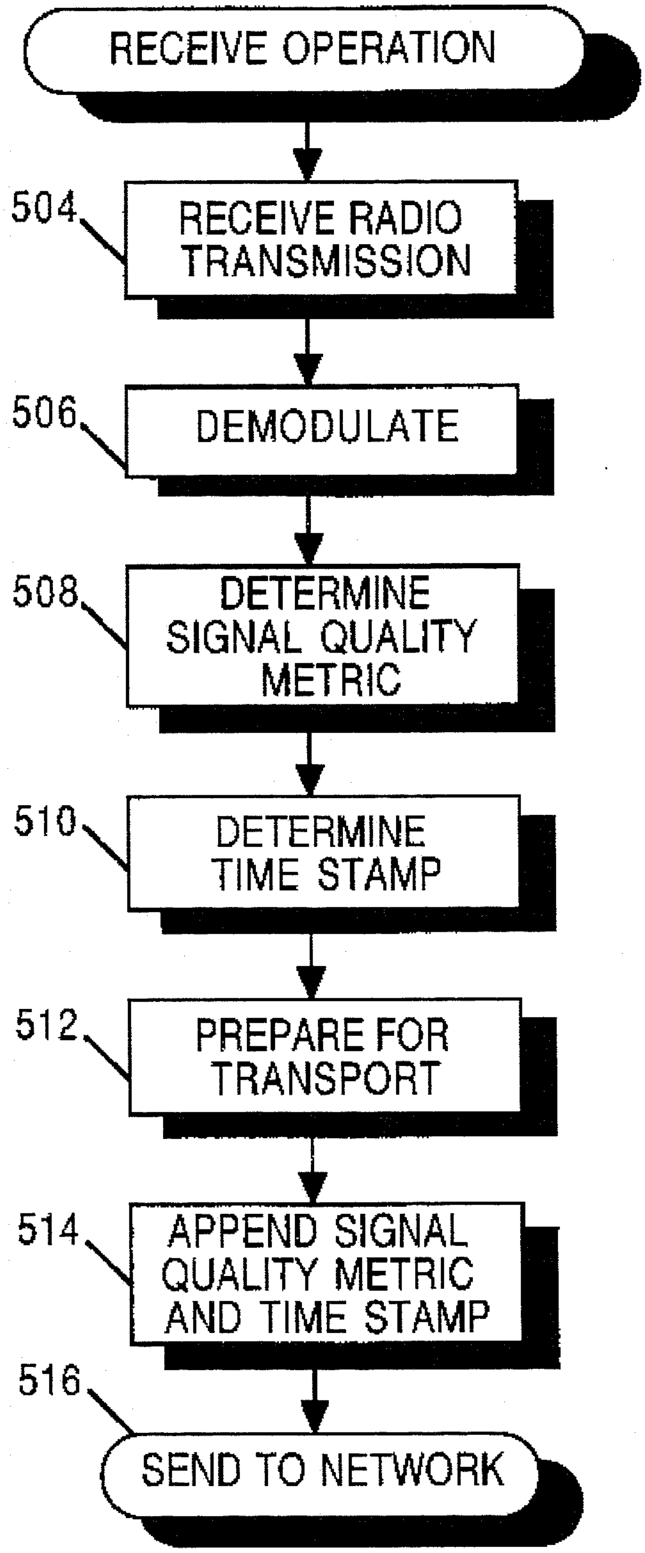
FIG. 5 illustrates a flow diagram for processing received signals in accordance with the present invention.

FIG. 5 illustrates a flow diagram for processing received signals in accordance with the present invention. The receive operation is carried out at each system site that is receiver equipped. Radio frequency signals are received 504 and are demodulated 506 to determine the information they carry. A signal quality metric is determined 508 for the received signals that will be used in a later step to determine which source (site) of received signals currently has the signal corresponding to the best signal quality metric or best quality signal. A signal quality metric may comprise one or a combination of, but is not limited to, signal strength of the received signal, signal-to-noise ratio of the received signal, or bit error rate of a demodulated digital information stream.

A time stamp is determined 510 for the received signals that is used in later steps to determine which received signals are to be compared and when they are to be transmitted. Time stamping eliminates the traditional requirement for time in-variant distribution links. The time stamp normally correlates the received signal with the time that it was received (time of arrival). As well, it may represent a pre-calculated launch time for the eventual transmitted signal where the launch time is derived by adding a predetermined offset to the time of arrival. The predetermined offset is a constant that is chosen based on the expected worse case digital network transmission delay between any two sites. To one skilled in the art, it is easily recognizable that the transmitter sites must have the signal to be transmitted in a buffer before the launch time.

The received signals are prepared for transport 512 to at least one of the other sites via the digital communication network. Normally the transport will be carried out to each of the sites involved in this communication re-using this same frequency where a transmitter is located. The preparation may include converting the received signal information into a received message digital format compatible for transport on the digital communication network and compatible for reception from the digital communication network by all the other sites. The digital format may be compressed and packetized to reduce the digital communication network bandwidth requirements.

The signal quality metric and time stamp are appended 514 to the corresponding received message to form a combined received message. The combined received message is transported 516 to all of the other transmitter equipped sites in the sub-network or entire network.

Figure 6:
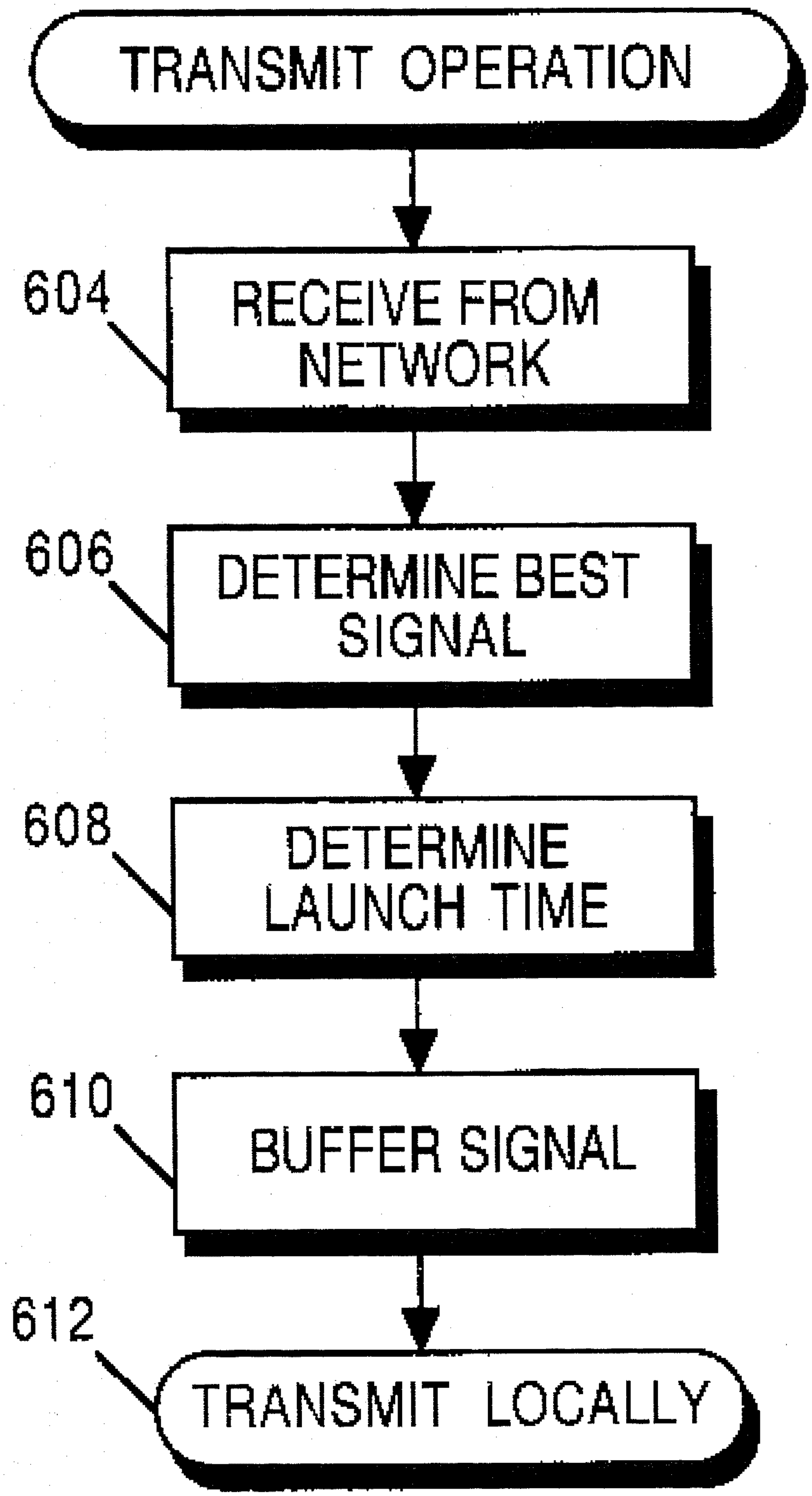
FIG. 6 illustrates a flow diagram for transmitting simulcast signals in accordance with the present invention.

FIG. 6 illustrates a flow diagram of the transmit operation in accordance with the present invention. The transmit operation is carried out at each system site that is transmitter equipped. The combined received messages are received 604 from the digital communication network. Based on an analysis of the signal quality metric indicators from the plurality of received sites for the signal with the same time stamp, the source (site) with the best quality signal is chosen 606 to be re-broadcast by the transmitter. The other signals are discarded. Since this process is the same at each site, i.e. each site compares the same received signals using the same signal quality metrics, each site chooses the same best quality received signal.

The launch time is the instant in time when all the universally coordinated transmitters will transmit the same modulation sequence in phase. For a chosen same best quality signal with a time of arrival time stamp, the launch time is determined 608 by adding a predetermined offset to the time of arrival time stamp. The predetermined offset is a constant that is chosen based on the expected worst case digital network transmission delay between any two sites. For a chosen same best quality signal with a time stamp of launch time, the launch time has already been determined.

The chosen same best quality signal is buffered 610 in a transmit time delay queue memory until launch time. When the launch time arrives, as indicated by the universal time standard, the transmitter transmits 612 the chosen same best quality signal from the local transmitter associated with the call and on the same frequency and substantially in phase with the other involved simulcast transmitter sites.

From the above, the present invention allows a group of two or more transceivers to receive a communication unit's transmission and re-broadcast that information on a same frequency simulcast carrier. The simulcast transmission is essentially in phase and on frequency so as to maximally utilize the efficiency of a single channel for a multi-site group dispatch communication. By not using a prior art star site configuration, the radio network is not susceptible to single site (prime site) failures thus providing a constant grade of service to the users, without the need for switching systems, without the need for duplicate systems, and without the need for time invariant distribution links.

We claim:

1. In a simulcast communication system that includes a plurality of sites, a time reference, at least two transmitters operable within the plurality of sites, and a plurality of communication units operable within the plurality of sites, wherein each site of the plurality of sites includes at least one receiver and receiver processing means for processing information and for transporting information to a digital communication network, wherein each of the at least two transmitters includes transmitter processing means for processing information and for receiving information from the digital communication network, and wherein the plurality of sites are operably linked together by the digital communication network, a method for each transmitter to determine signal quality of a received signal and transmitting, in substantial concurrence with each of the at least two transmitters, the received signal having a higher signal quality, the method comprising the steps of:

a) receiving, by a receiver in each of at least two sites, a signal from a communication unit of the plurality of communication units;

b) transporting, by each receiver processing means in each of the at least two sites, the signal to the at least two transmitters to produce at least two received signals;

c) comparing, by the at least two transmitter processing means, the at least two received signals to determine a highest quality signal; and d) transmitting, in phase, the highest quality signal by the at least two transmitters to the plurality of communication units.

2. In the method of claim 1, step (d) further comprises:

1) determining, by the at least two transmitters, a launch time of the highest quality signal;

2) time stamping, by the at least two transmitters, the highest quality signal with the launch time; and 3) transmitting, in phase, the highest quality signal at the launch time by the at least two transmitters.

3. In the method of claim 1, wherein the method of comparison to determine the highest quality signal of step (c) further comprises analyzing signal strength of the at least two received signals.

4. In the method of claim 1, wherein the method of comparison to determine the highest quality signal of step (c) further comprises analyzing signal to noise ratio of the at least two received signals.

5. In the method of claim 1, wherein the method of comparison to determine the highest quality signal of step (c) further comprises analyzing bit error rate of the at least two received signals.

6. In a simulcast communication system that includes a plurality of sites, a time reference, at least two transmitters, operable within the plurality of sites, and a plurality of communication units operable within the plurality of sites, wherein each site of the plurality of sites includes at least one receiver and receiver processing means for processing information and for transporting information to a digital communication network, wherein each of the at least two transmitters includes transmitter processing means for processing information and for receiving information from the digital communication network, and wherein the plurality of sites are operably linked together by the digital communication network, a method for each transmitter to determine signal quality of a received signal and transmitting, in substantial concurrence with each of the at least two transmitters, the received signal with a highest signal quality, the method comprising the steps of:

a) receiving, by a receiver in each of at least two sites, a signal from a communication unit of the plurality of communication units;

b) determining a signal quality metric for the signal by the receiver processing means of each said receiver;

c) determining, by the receiver processing means, a time stamp for the signal to produce an associated time stamp of each said receiver;

d) transporting, via the digital communication network, by each said receiver processing means in the at least two sites the signal and the associated time stamp to produce at least two received signals;

e) receiving, by the at least two transmitters via the digital communication network, the at least two received signals and the associated time stamp of each said receiver;

f) comparing, by the transmitter processing means of each of the at least two transmitters, the at least two received signals to determine a highest quality signal;

g) determining, by the transmitter processing means of each of the at least two transmitters, a launch time for the highest quality signal;

h) buffering, by the transmitter processing means of each of the at least two transmitters, the highest quality signal; and i) transmitting, by the transmitter processing means of each of the at least two transmitters, the highest quality signal at the launch time.

7. In the method of claim 6, wherein the determination of the signal quality metric of step (b) further comprises analyzing signal strength of the signal.

8. In the method of claim 6, wherein the determination of the signal quality metric of step (b) further comprises analyzing signal-to-noise ratio of the signal.

9. In the method of claim 6, wherein the determination of the signal quality metric of step (b) further comprises analyzing bit error rate of the signal.

10. In the method of claim 6, wherein the determination of the time stamp of step (c) further comprises determining time of arrival of the signal.

11. In the method of claim 10, wherein the determination of the time of arrival further comprises adding a predetermined offset to the time of arrival of the signal.

12. In the method of claim 6, wherein the transporting of the signal and the associated time stamp of step (d) further comprises compressing and packetizing the signal and the associated time stamp.

13. In the method of claim 6, wherein the determination of the launch time of step (g) further comprises adding a predetermined offset to time of arrival, at the receiver, of the highest quality signal.

14. In the method of claim 6, wherein the determination of the launch time of step (g) further comprises the associated time stamp of the highest quality signal.

15. In the method of claim 6, wherein the determination of the launch time of step (g) further comprises adding a predetermined offset to the associated time stamp of the highest quality signal.

* * * * *